United States Patent
Matsumura et al.

(10) Patent No.: US 11,974,270 B2
(45) Date of Patent: Apr. 30, 2024

(54) TERMINAL, RADIO COMMUNICATION METHOD, BASE STATION, AND SYSTEM FOR SUPRESSING DETERIORATION OF COMMUNICATION QUALITY

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 17/430,462

(22) PCT Filed: Feb. 14, 2019

(86) PCT No.: PCT/JP2019/005437
§ 371 (c)(1),
(2) Date: Aug. 12, 2021

(87) PCT Pub. No.: WO2020/166033
PCT Pub. Date: Aug. 20, 2020

(65) Prior Publication Data
US 2022/0124751 A1  Apr. 21, 2022

(51) Int. Cl.
*H04W 72/1263* (2023.01)
*H04L 5/00* (2006.01)
*H04W 72/23* (2023.01)

(52) U.S. Cl.
CPC ....... *H04W 72/1263* (2013.01); *H04L 5/0051* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0107352 A1* | 4/2020 | Tsai | H04B 7/0617 |
| 2020/0153543 A1* | 5/2020 | Khoshnevisan | H04W 72/23 |
| 2022/0191892 A1* | 6/2022 | Muruganathan | H04W 72/23 |

OTHER PUBLICATIONS

International Search Report issued in PCT/JP2019/005437 dated May 21, 2019 (1 page).
Written Opinion of the International Searching Authority issued in PCT/JP2019/005437 dated May 21, 2019 (4 pages).
Huawei, HiSilicon; "Enhancements on multi-TRP/panel transmission"; 3GPP TSG RAN WG1 Meeting #95, R1-1812243; Spokane, USA; Nov. 12-16, 2018 (10 pages).

(Continued)

*Primary Examiner* — Diane L Lo
(74) *Attorney, Agent, or Firm* — Osha Bergman Watanabe & Burton LLP

(57) ABSTRACT

In order to suppress deterioration of communication quality even when communication is performed using a plurality of transmission/reception points, an aspect of user terminal of the present disclosure includes: a reception section that receives given downlink control information including information regarding TCI states corresponding to the plurality of transmission/reception points; and a control section that controls reception of physical shared channels transmitted from the plurality of transmission/reception points based on the given downlink control information.

4 Claims, 12 Drawing Sheets

(56) References Cited

OTHER PUBLICATIONS

MediaTek Inc.; "Enhancements on multi-TRP/panel transmission"; 3GPP TSG RAN WG1 Meeting #95, R1-1812349; Spokane, USA; Nov. 12-16, 2018 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report in counterpart European Application No. 19915050.9 dated Aug. 23, 2022 (9 pages).
Office Action in counterpart Japanese Patent Application No. 2020-572014 dated Aug. 30, 2022 (7 pages).
H. Huawei; "Single PDCCH based multi-TRP/panel transmission"; 3GPP TSG RAN WG1 Ad-Hoc Meeting 1901, R1-1900848; Taipei; Jan. 21-25, 2019 (7 pages).
Zte; "Additional considerations on beam management for multi-TRP"; 3GPP TSG RAN WG1 Ad-Hoc Meeting 1901, R1-1900092; Taipei; Jan. 21-25, 2019 (6 pages).
Vivo; "MAC CEs format for beam management"; 3GPP TSG-RAN WG2 Meeting #101, R2-1801995; Athens, Greece; Feb. 26-Mar. 2, 2018 (7 pages).
Office Action issued in the counterpart Indonesian Application No. P00202106926, dated Aug. 11, 2023 (4 pages).

\* cited by examiner

FIG. 2A

| SET 0 | TCI CONFIGURATION 1 (CORRESPONDING TO ONE DMRS PORT GROUP) |
|---|---|
| SET 1 | TCI CONFIGURATION 2 (CORRESPONDING TO ONE DMRS PORT GROUP) |
| SET 2 | TCI CONFIGURATION 3 (CORRESPONDING TO ONE DMRS PORT GROUP) TCI CONFIGURATION 4 (CORRESPONDING TO ANOTHER DMRS PORT GROUP) |
| SET 3 | TCI CONFIGURATION 5 (CORRESPONDING TO ONE DMRS PORT GROUP) TCI CONFIGURATION 6 (CORRESPONDING TO ANOTHER DMRS PORT GROUP) |
| ... | ... |

FIG. 2B

| R | SERVING CELL ID | | | | | | BWP ID |
|---|---|---|---|---|---|---|---|
| SET 7 | SET 6 | SET 5 | SET 4 | SET 3 | SET 2 | SET 1 | SET 0 |
| SET 15 | SET 14 | SET 13 | SET 12 | SET 11 | SET 10 | SET 9 | SET 8 |
| ... | ... | ... | ... | ... | ... | ... | ... |

FIG. 2C

| TCI CODE POINT | TCI STATE |
|---|---|
| 000 | SET 0 |
| 001 | SET 1 |
| 010 | SET 2 |
| 011 | SET 5 |
| 100 | SET 8 |
| 101 | SET 10 |
| 110 | SET 11 |
| 111 | SET 14 |

FIG. 3A

| T0 | TCI STATE 1 CORRESPONDING TO ONE RS RESOURCE (CORRESPONDING TO ONE DMRS PORT GROUP) |
| --- | --- |
| T1 | TCI STATE 2 CORRESPONDING TO ONE RS RESOURCE (CORRESPONDING TO ONE DMRS PORT GROUP) |
| T2 | TCI STATE 3 CORRESPONDING TO ONE RS RESOURCE (CORRESPONDING TO ONE DMRS PORT GROUP) |
| T3 | TCI STATE 4 CORRESPONDING TO TWO RS RESOURCES (EACH RS RESOURCE CORRESPONDS TO ONE DMRS PORT GROUP) |
| T4 | TCI STATE 5 CORRESPONDING TO TWO RS RESOURCES (EACH RS RESOURCE CORRESPONDS TO ONE DMRS PORT GROUP) |
| ... | ... |

FIG. 3B

| R | SERVING CELL ID | | | | | BWP ID | |
| --- | --- | --- | --- | --- | --- | --- | --- |
| T7 | T6 | T5 | T4 | T3 | T2 | T1 | T0 |
| T15 | T14 | T13 | T12 | T11 | T10 | T9 | T8 |
| ... | ... | ... | ... | ... | ... | ... | ... |

FIG. 3C

| TCI CODE POINT | TCI STATE |
| --- | --- |
| 000 | T0 |
| 001 | T1 |
| 010 | T2 |
| 011 | T5 |
| 100 | T8 |
| 101 | T10 |
| 110 | T11 |
| 111 | T14 |

FIG. 4A
| T0 | TCI STATE 1 (CORRESPONDING TO DMRS PORT GROUP 1) |
| T1 | TCI STATE 2 (CORRESPONDING TO DMRS PORT GROUP 2) |
| T2 | TCI STATE 3 (CORRESPONDING TO DMRS PORT GROUP 1) |
| T3 | TCI STATE 4 (CORRESPONDING TO DMRS PORT GROUP 2) |
| T4 | TCI STATE 5 (CORRESPONDING TO DMRS PORT GROUP 1) |
| T5 | TCI STATE 6 (CORRESPONDING TO DMRS PORT GROUP 2) |
| ... | ... |
FIG. 4B
| R | SERVING CELL ID | | | | | BWP ID | |
|---|---|---|---|---|---|---|---|
| T7 | T6 | T5 | T4 | T3 | T2 | T1 | T0 |
| T15 | T14 | T13 | T12 | T11 | T10 | T9 | T8 |
| T23 | T22 | T21 | T20 | T19 | T18 | T17 | T16 |
| ... | ... | ... | ... | ... | ... | ... | ... |
FIG. 4C
| TCI CODE POINT | TCI STATE |
|---|---|
| 000 | T0 & T1 |
| 001 | T2 |
| 010 | T5 |
| 011 | T8 |
| 100 | T10 & T11 |
| 101 | T14 |
| 110 | T16 |
| 111 | T22 & T23 |

| R | Serving Cell ID | | | | | | | BWP ID |
|---|---|---|---|---|---|---|---|---|
| T7 | T6 | T5 | T4 | T3 | T2 | T1 | T0 |
| T15 | T14 | T13 | T12 | T11 | T10 | T9 | T8 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ |

| T0 | TCI STATE 1 (CORRESPONDING TO DMRS PORT GROUP 1) |
| T1 | TCI STATE 2 (CORRESPONDING TO DMRS PORT GROUP 1) |
| T2 | TCI STATE 3 (CORRESPONDING TO DMRS PORT GROUP 2) |
| T3 | TCI STATE 4 (CORRESPONDING TO DMRS PORT GROUP 2) |
| T4 | TCI STATE 5 (CORRESPONDING TO DMRS PORT GROUP 1) |
| T5 | TCI STATE 6 (CORRESPONDING TO DMRS PORT GROUP 2) |
| T6 | TCI STATE 7 (CORRESPONDING TO DMRS PORT GROUP 1) |
| T7 | TCI STATE 8 (CORRESPONDING TO DMRS PORT GROUP 2) |
| ... | CORRESPONDING TO DMRS PORT GROUP 2) |
| ... | CORRESPONDING TO DMRS PORT GROUP 2) |

FIG. 6B

| R | SERVING CELL ID | | | | | BWP ID | |
|---|---|---|---|---|---|---|---|
| T7 | T6 | T5 | T4 | T3 | T2 | T1 | T0 |
| T15 | T14 | T13 | T12 | T11 | T10 | T9 | T8 |
| T23 | T22 | T21 | T20 | T19 | T18 | T17 | T16 |
| ... | ... | ... | ... | ... | ... | ... | ... |

FIG. 6C

| TCI CODE POINT | TCI STATE |
|---|---|
| 000 | T0 |
| 001 | T2 |
| 010 | T5 |
| 011 | T8 |
| 100 | T10 & T11 |
| 101 | T14 |
| 110 | T16 |
| 111 | T22 & T23 |

FIG. 7A
| T0 | TCI STATE 1 (CORRESPONDING TO DMRS PORT GROUP 1) |
|---|---|
| ... | ... |
| T11 | TCI STATE 12 (CORRESPONDING TO DMRS PORT GROUP 1) |
| T12 | TCI STATE 13 (CORRESPONDING TO DMRS PORT GROUP 2) |
| ... | ... |
| T23 | TCI STATE 24 (CORRESPONDING TO DMRS PORT GROUP 2) |
FIG. 7B
| R | SERVING CELL ID | | | | | BWP ID | |
|---|---|---|---|---|---|---|---|
| T7 | T6 | T5 | T4 | T3 | T2 | T1 | T0 |
| T15 | T14 | T13 | T12 | T11 | T10 | T9 | T8 |
| T23 | T22 | T21 | T20 | T19 | T18 | T17 | T16 |
FIG. 7C
| TCI CODE POINT | TCI STATE |
|---|---|
| 00 | T0 |
| 01 | T13 |
| 10 | T2 & T14 |
| 11 | T10 & T22 |

TERMINAL, RADIO COMMUNICATION METHOD, BASE STATION, AND SYSTEM FOR SUPRESSING DETERIORATION OF COMMUNICATION QUALITY

TECHNICAL FIELD

The present disclosure relates to user terminal and a radio communication method in a next-generation mobile communication system.

BACKGROUND ART

In the universal mobile telecommunications system (UMTS) network, the specifications of long term evolution (LTE) have been drafted for the purpose of further increasing high speed data rates, providing lower delays and the like (see Non Patent Literature 1). Further, the specifications of LTE-Advanced (3GPP Rel.10 to 14) have been drafted for the purpose of further increasing capacity and advancement of LTE (third generation partnership project (3GPP) Release (Rel.) 8 and 9).

Successor systems to LTE (for example, also referred to as 5th generation mobile communication system (5G), 5G+ (plus), New Radio (NR), or 3GPP Rel.15 or later) are also being studied.

In the existing LTE system (for example, LTE Rel.8 to 13), the user terminal (user equipment (UE)) controls reception of a downlink shared channel (for example, physical downlink shared channel (PDSCH)) based on downlink control information (DCI), also referred to as DL assignment, etc.) from a radio base station. Further, the UE controls transmission of an uplink shared channel (for example, physical uplink shared channel (PUSCH)) based on DCI (also referred to as UL grant).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (for example, NR, 5G, 5G+, or Rel.16 or later), it is examined to perform communication using beam forming (BF). In order to improve the quality of the communication using BF, a control of at least one of signal transmission or signal reception in consideration of a quasi-co-location (QCL) relationship (QCL relationship) between multiple signals has been under study.

Furthermore, in future radio communication systems, it is also assumed that DL signals (for example, PDSCH) are transmitted from a plurality of transmission/reception points or a plurality of panels. In this case, it may be possible to control scheduling of PDSCHs to be transmitted from a plurality of transmission/reception points using one or a plurality of pieces of downlink control information (or PDCCHs).

However, when the scheduling of PDSCHs to be transmitted from a plurality of transmission/reception points is controlled using given DCI (e.g., one piece of DCI), how to control processing of receiving the PDSCHs becomes a problem. For example, in the reception processing, the UE needs to perform at least one of rate matching processing, determination of quasi-co-location (QCL), and determination of allocated resources of the PDSCH, but specific reception processing has not been sufficiently studied. In a case where the reception processing is not properly performed, the quality of communication using a plurality of transmission/reception points may deteriorate.

The present disclosure has been made in view of the above, and an object of the present disclosure is to provide user terminal and a radio communication method that can suppress deterioration of communication quality even in a case where communication is performed using a plurality of transmission/reception points.

Solution to Problem

User terminal according to an aspect of the present disclosure includes: a reception section that receives given downlink control information including information regarding TCI states corresponding to a plurality of transmission/reception points; and a control section that controls reception of physical shared channels transmitted from the plurality of transmission/reception points based on the given downlink control information.

Advantageous Effects of Invention

According to an aspect of the present disclosure, it is possible to suppress deterioration of communication quality even in a case where communication is performed using a plurality of transmission/reception points.

BRIEF DESCRIPTION OF DRAWINGS

FIGS. 2A to 2C are diagrams illustrating an example of a method of giving an indication of information regarding a TCI state.

FIGS. 3A to 3C are diagrams illustrating another example of a method of giving an indication of information regarding a TCI state.

FIGS. 4A to 4C are diagrams illustrating another example of a method of giving an indication of information regarding a TCI state.

FIG. 5 is a diagram illustrating an example of TCI states to be paired.

FIGS. 6A to 6C are diagrams illustrating another example of a method of giving an indication of information regarding a TCI state.

FIGS. 7A to 7C are diagrams illustrating another example of a method of giving an indication of information regarding a TCI state.

DESCRIPTION OF EMBODIMENTS

In future radio communication systems, a study is underway to perform non-coherent DL (for example, PDSCH) transmission from each of a plurality of transmission/reception points (TRPs). The joint transmission of non-coherent DL signals (or DL channels) from a plurality of TRPs may be referred to as non-coherent joint transmission (NCJT). Further, in the present specification, the transmission/reception point (TRP) may be read as a transmission point, a reception point, a panel, or a cell.

Further, it is also assumed that scheduling of non-coherent PDSCHs to be transmitted from a plurality of TRPs is controlled using given DCI (e.g., single DCI).

In this case, it is also conceivable to allocate PDSCHs transmitted from different TRPs to the same resource (for example, time and frequency resources) and transmit the PDSCHs. For example, a configuration in which PDSCHs corresponding to the same codeword (CW) are transmitted by different layers (see FIG. 1A) and a configuration in which PDSCHs corresponding to different CWs are transmitted (see FIG. 1B) may be supported. Note that the CW may be read as a transport block (TB).

Figure 1A:
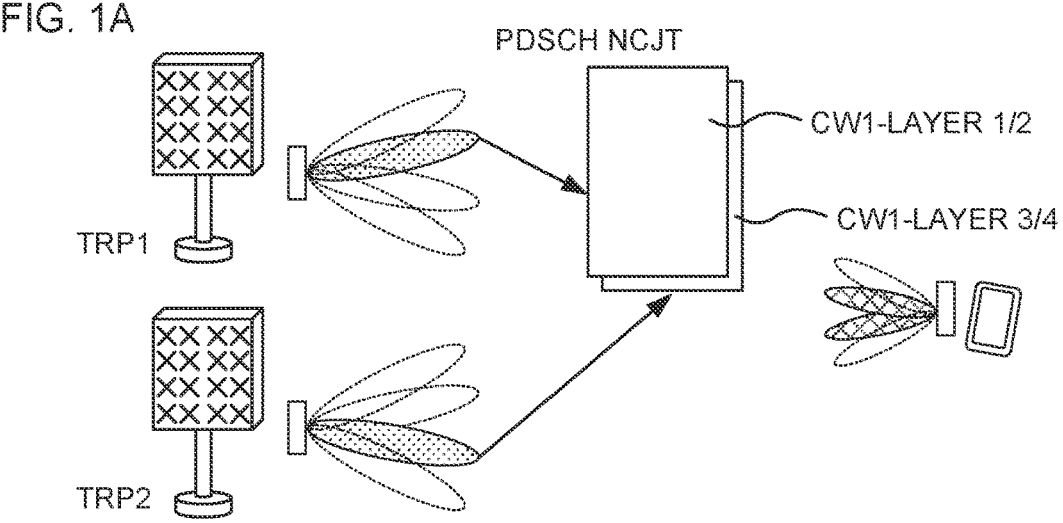
FIG. 1A to 1C are diagrams illustrating an example of a case where PDSCHs are transmitted from one or more TRP points.

FIG. 1A illustrates a case where the PDSCH (corresponding to CW #1) transmitted from a first TRP uses at least one of layers 1 and 2 and the PDSCH (corresponding to CW #1) transmitted from a second TRP uses at least one of layers 3 and 4, and the PDSCHs are allocated to the same time and frequency resources.

Figure 1B:
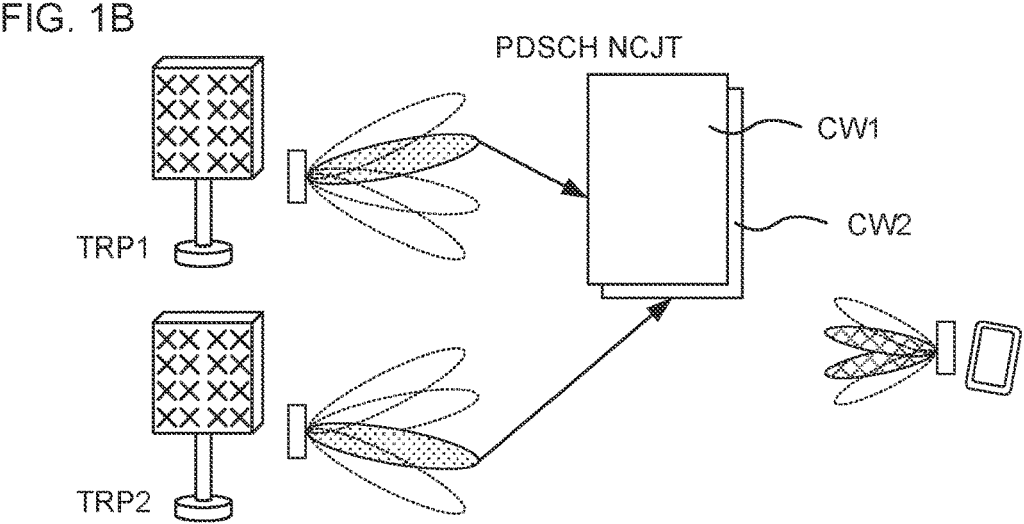

FIG. 1B illustrates a case where the PDSCH (corresponding to CW #1) transmitted from the first TRP and the PDSCH (corresponding to CW #2) transmitted from the second TRP are allocated to the same time and frequency resources. Note that the PDSCH transmitted from the first TRP and the PDSCH transmitted from the second TRP may be allocated to resources in which at least one of time and frequency is different.

However, in a case where the PDSCHs transmitted from the plurality of TRPs are scheduled using single DCI, how to control indication of quasi-co-location (QCL), indication of rate matching, or the like in the PDSCH reception processing becomes a problem.

Figure 1C:
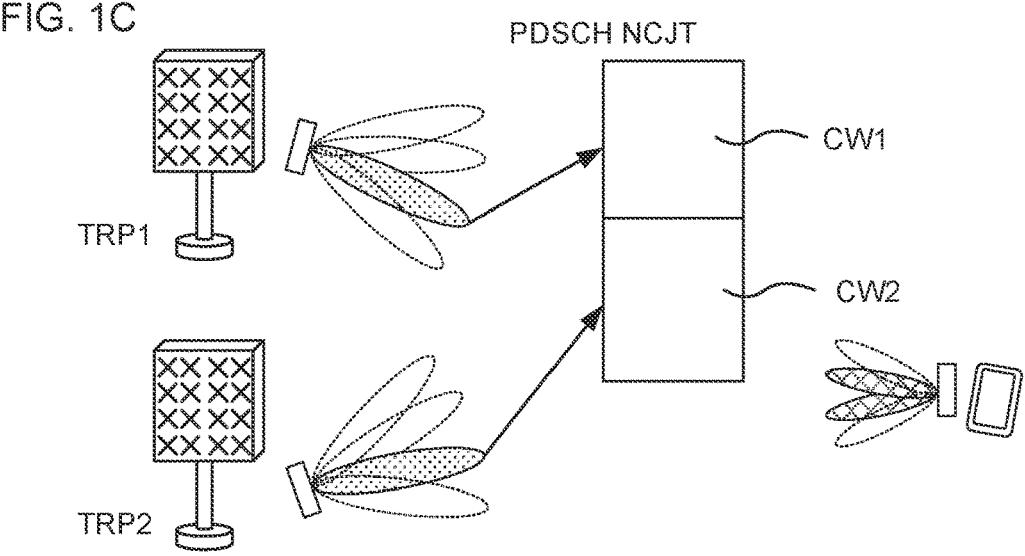

Further, it is also conceivable to allocate PDSCHs transmitted from different TRPs to different resources (for example, resources in which at least one of time and frequency resources is different) and transmit the PDSCHs. (see FIG. 1C). FIG. 1C illustrates a case where the PDSCH (corresponding to CW #1) transmitted from the first TRP and the PDSCH (corresponding to CW #2) transmitted from the second TRP are allocated to different time and frequency resources.

However, in a case where the PDSCHs transmitted from the plurality of TRPs are scheduled using common DCI (for example, single DCI) among the plurality of TRPs, how to control the reception processing for the PDSCH from each TRP becomes a problem.

The present inventors have focused on the fact that, in a case where PDSCHs transmitted from a plurality of TRPs are scheduled by given DCI (for example, one DCI), the given DCI corresponds to a plurality of PDSCHs, and have conceived of giving an indication of information necessary at the time of reception processing for each PDSCH using the given DCI.

In an aspect of the present disclosure, reception of DL signals (for example, PDSCHs) transmitted from a plurality of TRPs is controlled based on given downlink control information including information regarding TCI states corresponding to the plurality of TRPs. Note that the TRP may be read as at least one of a DMRS group and a DMRS port group. Further, the TCI state may be read as quasi-co-location (QCL).

(QCL for PDSCH)

The quasi-co-location (QCL) is an indicator indicating the statistical properties of a channel. For example, when one signal and another signal have a QCL relationship, this means that it is possible to assume that the plurality of different signals have at least one identical property out of: Doppler shift, Doppler spread, average delay, delay spread, and spatial parameter (for example, spatial Rx parameter)).

The QCL may be provided with one or more types (QCL types) having different parameters or parameter sets that can be assumed to be the same. For example, four QCL types A to D with different parameters that can be assumed to be the same may be provided.

QCL type A: QCL that can be assumed to have the same Doppler shift, Doppler spread, average delay, and delay spread QCL type B: QCL that can be assumed to have the same Doppler shift and Doppler spread QCL type C: QCL that can be assumed to have the same average delay and Doppler shift QCL type D: QCL that can be assumed to have the same spatial Rx parameter The state (TCI state (TCI-state)) of a transmission configuration indicator (TCI) may indicate (include) information regarding the QCL of the PDSCH (also referred to as QCL information or QCL information for the PDSCH). The QCL information for the PDSCH is, for example, information regarding the QCL between the PDSCH (or the DMRS port for the PDSCH) and a downlink reference signal (DL-RS), and may include, for example, at least one of information regarding a DL-RS having a QCL relationship (DL-RS related information) and information indicating the QCL type (QCL type information).

Here, the DMRS port is an antenna port of a demodulation reference signal (DMRS). The DMRS port may be a DMRS port group that includes a plurality of DMRS ports, and the DMRS port herein may be read as a DMRS port group.

The DL-RS related information may include at least one of information indicating a DL-RS having a QCL relationship and information indicating a resource of the DL-RS. For example, when a plurality of reference signal sets (RS sets) is configured in the UE, the DL-RS related information may indicate a given DL-RS having a QCL relationship with the PDSCH (or DMRS port for the PDSCH) and a resource of the DL-RS among reference signals included in the RS sets.

Here, the DL-RS may be at least one of a synchronization signal (for example, at least one of a primary synchronization signal (PSS) and a secondary synchronization signal (SSS)), a mobility reference signal (mobility RS (MRS)), a synchronization signal block (SSB), a channel state information reference signal (CSI-RS), a demodulation reference signal (DMRS), a broadcast channel (physical broadcast channel (PBCH)), a beam-specific signal, and the like, or a signal constituted by extension and/or change thereof (e.g., a signal constituted by changing the density and/or the period).

As described above, each TCI state can indicate (include) the QCL information for the PDSCH. An indication of one or more TCI states (QCL information for one or more PDSCHs) may be given to (configured in) the UE from the radio base station by higher layer signaling (for example, RRC signaling). Note that the number of TCI states configured in the UE may be limited by the QCL type.

The DCI (DL assignment) used for PDSCH scheduling may include a given field (TCI state indication field) indicating a TCI state (QCL information for the PDSCH). The TCI state indication field may be constituted by a given number of bits (for example, any of 1 to 3 bits). Whether or not the TCI state field is included in the DCI may be controlled by an indication (for example, higher layer signaling) from the radio base station.

For example, in the case where the DCI includes a 3-bit TCI state indication field, the radio base station can preliminarily configure up to eight types of TCI state in the UE by using higher layer signaling. A value of the TCI state field in the DCI (TCI state field value) may indicate one of the TCI states preliminarily configured by higher layer signaling.

In a case where more than a given number of (for example, eight) TCI states are configured in the UE, less than or equal to the given number of TCI states may be activated (or specified) by a given signal (e.g. medium access control control element (MAC CE)). The value of the TCI state indication field in the DCI may indicate one of the TCI states activated by MAC CE (hereinafter also referred to as MAC control information).

The UE determines the QCL of the PDSCH (or the DMRS port of the PDSCH) based on the TCI state (the QCL information for the PDSCH) indicated by the DCI. For example, by assuming that the DMRS port (or DMRS port group) of the PDSCH of a serving cell has a QCL relation with the DL-RS corresponding to the TCI state whose indication has been given by the DCI, the UE controls PDSCH reception processing (for example, decode processing and/or demodulation processing, or the like). This makes it possible to improve the PDSCH reception accuracy.

Hereinafter, the present embodiment will be described in detail with reference to the drawings. Note that, in the following description, a case of being used for demodulating the PDSCH based on the TCI state will be described, but the present embodiment is not limited thereto. It may be applied regarding operations utilizing TCI states (for example, reception processing for another signal or channel). Further, the present embodiment may be applied to transmission processing for a UL signal (for example, PUSCH).

Further, in the following description, QCL may be read as spatially quasi co-located (QCL). Further, when the PDSCH is transmitted from one transmission/reception point, transmission from a joint cell may be included.

In the following description, the information regarding the TCI state will be described, but the information regarding the TCI state may be read as information regarding rate matching (RM) or information regarding quasi-co-location.

Further, the following aspect can be applied to any communication system using a plurality of TRPs. For example, it may be applied to a configuration (NCJT) in which DL signals (for example, CWs or TBs) that become non-coherent transmission are jointly transmitted from a plurality of TRPs, and a configuration in which one DL signal (for example, CW or TB) is repeatedly transmitted from each TRP.

The configuration in which one CW/TB is repeatedly transmitted from each TRP may be any of a method for repeatedly transmitting one CW or TB from each TRP in temporally different symbols or slots (time multiplexing (TDM)), a method for repeatedly transmitting one CW or TB from each TRP using different frequency resources in the same time domain (for example, symbols) (frequency multiplexing (FDM)), and a method for repeatedly transmitting one CW or TB from each TRP using the same frequency resources in the same time domain (for example, symbols) (spatial multiplexing (SDM)).

First Aspect

In a first aspect, the UE is notified of information regarding a set of TCI states including one or a plurality of TCI states by using given DCI (for example, single DCI) or the like for scheduling data (for example, PDSCH or DL-SCH) from one or more TRPs. Note that, in the following description, a case where the number of TRPs that transmit the DL signal to the UE is two or less will be described as an example, but the number of TRPs is not limited thereto, but may be three or more.

<Set Configuration by Higher Layer>

The network (for example, a base station) may configure a combination (which may be referred to as a set, a TCI set, or a set of TCI states) including one or more TCI configurations (or TCI states) in the UE. FIG. 2A illustrates an example of a TCI set configured in the UE by using higher layer signaling. Here, a case is illustrated where TCI configuration 1 is included in set 0, TCI configuration 2 is included in set 1, TCI configuration 3 and TCI configuration 4 are included in set 2, and TCI configuration 5 and TCI configuration 6 are included in set 3. The number of sets configured by higher layer may be a given number (for example, 8, 16, 32, or the like).

Each TCI configuration (or TCI state) may be associated with any TRP (or a DMRS port, a DMRS port group). For example, when the UE receives the PDSCH from N (here N=2) TRPs (TRP1 and TRP2), each TCI configuration may be configured in association with either TRP1 or TRP2. The base station may notify the UE of related information between the TCI configuration and the TRP.

For example, when a TCI set includes one TCI configuration (here, set 0 and set 1), the TCI configuration may be associated with one of TRP1 or TRP2. When a TCI set includes a plurality of TCI configurations (here, set 2, set 3), the plurality of TCI configurations included in each set may be associated with different TRPs. For example, TCI configuration 3 included in set 2 may be associated with one of TRP1 and TRP2, and TCI configuration 4 may be associated with the other of TRP1 and TRP2.

<Set Selection According to MAC CE>

When the number of TCI sets configured by higher layer signaling is greater than a given value (for example, eight), the base station may specify, to the UE, a TCI set to be activated (or mapped to a given field of the DCI) by using the MAC control information (see FIG. 2B). That is, the UE may select the TCI set to be activated based on the MAC control information transmitted from the base station. The selected TCI set may be configured (or mapped) to a code point of a given bit field included in the DCI. The given bit field may be, for example, a bit field for TCI state indication.

FIG. 2B illustrates a case where set 0, set 1, set 2, set 5, set 8, set 10, set 11, and set 14 are activated according to the MAC control information from the plurality of sets configured in a higher layer. The activated set may, for example, be configured to a code point of a given bit field included in the DCI in an index order (see FIG. 2C).

<Set Specifying by DCI>

The base station may notify the UE of the given TCI set by using the DCI. For example, the UE determines the set notified from the base station based on the code point notified in the given field included in the DCI. FIG. 2C illustrates an example in which the given field has 3 bits, but the number of bits of the given field is not limited thereto. It is sufficient if the UE performs reception processing for the PDSCH transmitted from the TRP based on the TCI state included in the notified set.

Further, the UE may determine at least one of the TRP index and the number of TRPs for transmitting the PDSCH based on the TCI configuration included in the specified set. For example, when set 0 is specified, the UE may determine that the PDSCH is transmitted from one TRP. On the other hand, when set 2 is specified, the UE may determine that the PDSCH is transmitted from a plurality of (here, two) TRPs.

As described above, by notifying the UE of the set including one or a plurality of TCI configurations, it is possible to appropriately give an indication of the TCI state corresponding to each TRP even in a case where the PDSCHs from the plurality of TRPs are scheduled by using given DCI.

Second Aspect

In a second aspect, given DCI or the like for scheduling data (for example, PDSCH or DL-SCH) from a plurality of TRPs is used to notify the UE of a TCI state (or TCI configuration) associated with one or a plurality of reference signal resources (RS resource, also referred to as RS resources).

<TCI State Configuration by Higher Layer>

The network (for example, a base station) may configure a TCI state associated with one or more RS resources in the UE. FIG. 3A illustrates an example of a TCI state configured in the UE by using higher layer signaling. The UE may be notified of information regarding the RS resources (RS type, RS transmission conditions, or the like) from the base station in advance by using higher layer signaling or the like.

Here, a case is illustrated in which TCI state 1 corresponding to one RS resource (or having one RS resource) is configured to "T0", TCI state 2 corresponding to one RS resource is configured to "T1", TCI state 3 corresponding to one RS resource is configured to "T2", TCI state 4 corresponding to two RS resources is configured to "T3", and TCI state 5 corresponding to two RS resources is configured to "T4". "T5" and the following may be appropriately configured.

A TCI state corresponding to one RS resource (here, TCI states 1 to 3) may be associated with any TRP (or a DMRS port, a DMRS port group). For example, when the UE receives the PDSCH from N (here N=2) TRPs (TRP1 and TRP2), TCI states 1 to 3 (T0 to T2) may be configured in association with either TRP1 or TRP2. T0 to T2 may be associated with the same TRP, or may be associated with different TRPs. Further, the base station may notify the UE of related information between the TCI state and the TRP.

In a TCI state corresponding to a plurality of (here, two) RS resources (here, TCI states 4 to 5), each RS resource may be associated with one TRP (or a DMRS port, a DMRS port group). For example, one RS resource may be associated with one of TRP1 and TRP2, and the other RS resource may be associated with the other of TRP1 and TRP2.

Further, the plurality of RS resources may correspond to QCLs of different types. For example, among the two RS resources corresponding to TCI state 4, one RS resource may correspond to QCL type B and the other RS resource may correspond to QCL type D.

<TCI State Selection According to MAC CE>

When the number of TCI states (or "Ts") configured by higher layer signaling is greater than a given value (for example, eight), the base station may specify, to the UE, a TCI state to be activated by using the MAC control information (see FIG. 3B). That is, the UE may select the TCI state to be activated based on the MAC control information transmitted from the base station. The selected TCI state may be configured to a code point of a given bit field included in the DCI. The given bit field may be, for example, a bit field for TCI state indication.

FIG. 3B illustrates a case where T0, T1, T2, T5, T8, T10, T11, and 14 are activated according to the MAC control information from the plurality of TCI states configured in a higher layer. Here, a case where the activated TCI state is mapped to a code point of a given bit field included in the DCI in an index order is illustrated (see FIG. 3B).

<TCI State Specifying by DCI>

The base station may notify the UE of the given TCI state by using the DCI. For example, the UE determines the TCI state notified from the base station based on the code point notified in the given field included in the DCI. FIG. 3C illustrates an example in which the given field has 3 bits, but the number of bits of the given field is not limited thereto. It is sufficient if the UE performs reception processing for the PDSCH transmitted from the TRP based on the notified TCI state (or RS resource associated with the TCI state).

Further, the UE may determine at least one of the TRP index and the number of TRPs for transmitting the PDSCH based on the RS resource corresponding to the specified TCI state. For example, when a TCI state with which one RS set is associated is specified, the UE may determine that the PDSCH is transmitted from one TRP. On the other hand, when a TCI state with which two RS sets are associated is specified, the UE may determine that the PDSCH is transmitted from a plurality of (here, two) TRPs.

As described above, by notifying the UE of the TCI state corresponding to one or a plurality of RS resources, it is possible to appropriately give an indication of the TCI state corresponding to each TRP even in a case where the PDSCHs from the plurality of TRPs are scheduled by using given DCI.

Third Aspect

In a third aspect, the UE is notified of one or a plurality of TCI states (or TCI configurations) by using given DCI or the like for scheduling data (for example, PDSCH or DL-SCH) from a plurality of TRPs.

For example, specifying two or more TCI states is allowed using at least one code point of a given field included in the DCI. Further, a plurality of TCI states corresponding to a given code point may be defined or configured in advance as a pair (or a group, a set). In the following description, a case where the maximum number of TCI states corresponding to each code point is two is taken as an example, but the number of TCI states corresponding to each code point may be three or more. For example, in the following description, pairs may be replaced with groups or sets.

<Set Configuration by Higher Layer>

The network (for example, a base station) may configure a TCI state associated with a given TRP (or a DMRS port, a DMRS port group) in the UE. FIG. 4A illustrates an example of a TCI state configured in the UE by using higher layer signaling.

Here, a case is illustrated in which TCI state 1 corresponding to TRP1 (or DMRS port 1, DMRS port group 1) is configured to "T0", TCI state 2 corresponding to TRP2 is configured to "T1", TCI state 3 corresponding to TRP1 is configured to "T2", TCI state 4 corresponding to TRP2 is configured to "T3", TCI state 5 corresponding to TRP1 is configured to "T4", and TCI state 6 corresponding to TRP2 is configured to "T5". "T6" and the following may be appropriately configured.

In the TCI state (or T) configured in a higher layer, TCI states having contiguous indexes may be configured as a pair of TCI states (or also referred to as a set or a combination). In the following description, a case where "T0 and T1", "T2 and T3", "T4 and T5", ... "T22 and T23", ... are configured as pairs will be described. Of course, the combination of the TCI states (or Ts) is not limited thereto.

The base station may configure such that TRPs respectively associated with two TCI states (for example, TCI state 1 and TCI state 2) configured as a pair are different. With the configuration in which the TCI states included in the pair are associated with different TRPs (or RS resources), it is possible to specify the QCL corresponding to a plurality of TRPs in one pair.

<TCI State Selection According to MAC CE>

When the number of TCI states (or Ts) or the number of pairs of TCI states configured by higher layer signaling is greater than a given value (for example, eight), the base station may notify the UE of the TCI state or the TCI state pair to be activated by using the MAC control information (see FIG. 4B). The UE may determine the TCI state (or pair of TCI states) to be activated based on the MAC control information transmitted from the base station.

A TCI state (or a TCI state pair) specified according to the MAC control information may be configured to a code point of a given bit field included in the DCI. The given bit field may be, for example, a bit field for TCI state indication. Further, the TCI state may be configured for each code point in units of pairs.

For example, in a case where a pair is constituted by TCI states (or Ts) having contiguous indexes (see FIG. 5), the base station may control the activation of each TCI state so that the number of pairs is equal to or less than a given value.

FIG. 4B illustrates a case where T0, T1, T2, T5, T8, T10, T11, T14, T16, T22, and T23 are activated according to the MAC control information from the plurality of TCI states configured in a higher layer. Furthermore, here, a case where the number of pairs specified according to the MAC control information is eight or less is illustrated. Note that only one TCI state of a plurality of paired TCI states (here, two TCI states) may be activated, or both TCI states may be activated.

In a case where at least one TCI state among the TCI states included in the pair is activated, the UE may assume that the pair is activated and determine that the TCI state included in the pair is configured to the code point of the given field included in the DCI. For example, when the number specified in the given field is N (for example, eight), up to N pairs may be activated according to the MAC control information.

Further, the TCI state corresponding to a given code point may be the TCI state activated according to the MAC control information among the TCI states included in the pair corresponding to the given code point. That is, two TCI states may correspond to the given code point when two TCI states included in the pair are activated, and one TCI state may correspond to the given code point when only one TCI state included in the pair is activated.

On the other hand, in a case where all of the plurality of (here, two) TCI states included in the pair are not activated, it may be determined that the pair is deactivated and is not configured to the code point of the given field of the DCI.

The UE may assume that two TCI states are configured to the code point when both of the TCI states included in the pair are activated. On the other hand, it may possible to assume that one TCI state is configured to the code point when one of the TCI states included in the pair is activated.

For example, the pair constituted by T0 and T1 may be configured to be configured or mapped to a given code point of the DCI in at least one of the following cases 1 to 3.

Case 1: T0=1, T1=0 (T0 is activated)
Case 2: T0=0, T1=1 (T1 is activated)
Case 3: T0=1, T1=1 (both T0 and T1 are activated)

On the other hand, the pair constituted by T0 and T1 is not configured or mapped to a given code point of the DCI in the following case 4.

Case 4: T0=0, T1=0 (both T0 and T1 are deactivated)

The two TCI states included in each pair may be TCI states of different types. For example, two TCI states included in each pair may correspond to different CDM groups, DMRS ports, DMRS port groups, TRPs, or panels. Information regarding a CDM group, a DMRS port, a DMRS port group, a TRP, or a panel to which each TCI state corresponds may be configured in the UE by higher layer signaling or the like.

Alternatively, the two TCI states included in each pair may be TCI states of the same type. For example, two TCI states included in each pair may correspond to the same CDM group, DMRS port, DMRS port group, TRP, or panel. When the two TCI states correspond to the same CDM group, DMRS port, DMRS port group, TRP, or panel, one of the two TCI states may be activated according to the MAC control information.

The TCI state (or pair) activated according to the MAC control information may be configured or mapped to a code point of a given field in the DCI based on a given rule. For example, the order of mapping to each code point may be determined based on an index of a TCI state included in the pair in which the activated TCI state is included (for example, in ascending order of the index).

In this manner, one or more pairs are mapped to a given field of the DCI according to the MAC control information. Further, a pair mapped to each code point of the given field includes one or a plurality of (here, two) TCI states. Note that whether or not to apply activation of the TCI state or pair (or mapping to the DCI) according to the MAC control information may be configured by higher layer signaling or the like.

<TCI State Specifying by DCI>

The base station may notify the UE of the given TCI state by using the DCI. For example, the UE determines the TCI state notified from the base station based on the code point notified in the given field included in the DCI. FIG. 4C illustrates an example in which the given field has 3 bits, but the number of bits of the given field is not limited thereto. It is sufficient if the UE performs reception processing for the PDSCH transmitted from the TRP based on the notified TCI state.

The UE may determine at least one of the TRP index and the number of TRPs for transmitting the PDSCH based on the specified TCI state. For example, when a code point to which one TCI state is mapped is specified, the UE may determine that the PDSCH is transmitted from one TRP. On the other hand, when an indication of a code point to which two TCI states are mapped is given, the UE may determine that the PDSCH is transmitted from a plurality of (here, two) TRPs.

As described above, by notifying the UE of the code point to which one or a plurality of TCI states are mapped, it is possible to appropriately give an indication of the TCI state corresponding to each TRP even in a case where the PDSCHs from the plurality of TRPs are scheduled by using given DCI.

Note that FIG. 4A illustrates a case where TRP1 is associated with a TCI state with an odd index and TRP2 is associated with a TCI state with an even index, but it is not limited thereto.

For example, the same TRP (or DMRS port, DMRS port group) may be associated with TCI states having contiguous indexes and configured in the UE by higher layer signaling (see FIG. 6A). The base station may associate the paired two TCI states with the same TRP, or may configure them to be associated with different TRPs. Here, a case is illustrated where two TCI states are associated with the same TRP in a T0 and T1 pair and a T2 and T3 pair, and two TCI states are associated with the same TRP in a T4 and T5 pair and a T6 and T7 pair.

The base station may control to activate either (or up to one) TCI state regarding a pair including TCI states associated with the same TRP when an indication of the TCI state to be activated according to the MAC control information is given (see FIG. 6B). Further, the base station may control to activate at least one (or up to two) TCI state regarding a pair including TCI states associated with different TRPs.

In this case, with the pair including TCI states corresponding to the same TRP, either one of the TCI states is configured to a code point of a given field of the DCI (see FIG. 6C). Further, with the pair including TCI states corresponding to different TRPs, at least one (or up to two) TCI state is configured to a code point of a given field of the DCI.

The UE may determine at least one of the TRP index and the number of TRPs for transmitting the PDSCH based on the number of TCI states configured to each code point.

<Variations>

In the third aspect, the case where the pair is constituted by the TCI states (or Ts) having contiguous indexes has been described, but the pair may be formed by non-contiguous TCI states (or Ts). Hereinafter, a case where a pair is formed by TCI states (or Ts) having non-contiguous indexes will be described.

<Set Configuration by Higher Layer>

FIG. 7A illustrates an example of a TCI state configured in the UE by using higher layer signaling. Here, a case is illustrated in which TCI states 1 to 12 corresponding to TRP1 (or DMRS port 1, DMRS port group 1) are configured respectively to "T0" to "T11", and TCI states 13 to 23 corresponding to TRP2 are configured to "T12" to "T23". Note that the number of configurable TCI states (or Ts) is not limited to 24.

TCI states (for example, TCI state 1 and TCI state 2) corresponding to the same TRP (or DMRS port 1, DMRS port group 1) may refer to the same RS resource.

Here, TCI states having non-contiguous indexes are configured as a pair. The pair of TCI states may be defined in a specification in advance, or may be configured in the UE by higher layer signaling or the like.

For example, $T_i$ and $T_{i+X}$ may be configured as a pair. For example, X may be a value determined based on a maximum number of TCI states (here, 24) configured by higher layer signaling. As an example, it may be a value that is half the maximum number of TCI states (here, 12). In this case, a pair of T0 and T12 is formed. Similarly, pairs of T1 and T13, T2 and T14, . . . and T11 and T23 are formed.

$T_0$ to $T_{X-1}$ may correspond to the same CDM group, DMRS port, DMRS port group, TRP, or panel. Similarly, $T_X$ to $T_{2X-1}$ may correspond to the same CDM group, DMRS port, DMRS port group, TRP, or panel. Further, $T_0$ to $T_{X-1}$ and $T_X$ to $T_{2X-1}$ may correspond to different CDM groups, DMRS ports, DMRS port groups, TRPs, or panels.

In this manner, by associating different TRPs (or RS resources) with two TCI states (for example, T0 and T12) configured as a pair, it is possible to specify QCL corresponding to a plurality of TRPs with one pair.

<TCI State Selection According to MAC CE>

When the number of TCI states (for example, T0 to T23) or the number of pairs of TCI states configured by higher layer signaling is greater than a given value (for example, four), the base station may notify the UE of the TCI state or the TCI state pair to be activated by using the MAC control information (see FIG. 7B). That is, the UE may select at least one of the TCI state and the TCI state pair to be activated based on the MAC control information transmitted from the base station.

At least one of the TCI state and the TCI state pair instructed to be activated may be configured to the code point of the given bit field included in the DCI. The given bit field may be, for example, a bit field for TCI state indication.

FIG. 7B illustrates a case where T0, T2, T10, T13, T14, and T22 are activated according to the MAC control information from the plurality of TCI states configured in a higher layer. Note that only one TCI state of a plurality of paired TCI states (here, two TCI states) may be activated, or both TCI states may be activated.

In a case where at least one TCI state among the TCI states included in the pair is activated, the UE may assume that the pair is activated and determine that the TCI state included in the pair corresponds to the code point of the given field included in the DCI. For example, when the number notified in the given field is N (for example, four (or 2 bits)), up to N pairs may be activated according to the MAC control information.

Further, the TCI state corresponding to a given code point may be the TCI state activated according to the MAC control information among the TCI states included in the pair corresponding to the given code point. That is, two TCI states may correspond to the given code point when two TCI states included in the pair are activated, and one TCI state may correspond to the given code point when only one TCI state included in the pair is activated.

On the other hand, in a case where all of the plurality of (here, two) TCI states included in the pair are not activated, the UE may determine that the pair is deactivated and is not configured to the code point of the given field of the DCI.

The TCI state (or pair) activated according to the MAC control information may be configured or mapped to a code point of a given field in the DCI based on a given rule. For example, the order of mapping to each code point may be determined based on an index of a TCI state included in the pair to which the activated TCI state belongs. As an example, the TCI states included in the pair may be mapped to code points in ascending order of the index.

In this case, in a case where only one TCI state included in the pair is activated, an index of a TCI state that is not activated may also be taken into consideration to determine the order of mapping to a code point of a given field (see FIG. 7C). In FIG. 7C, T1 is not activated in the pair including T1 and T13, and only T13 is activated, but T1 (index 1) may be considered to determine the mapping to the code point.

Figure 8:
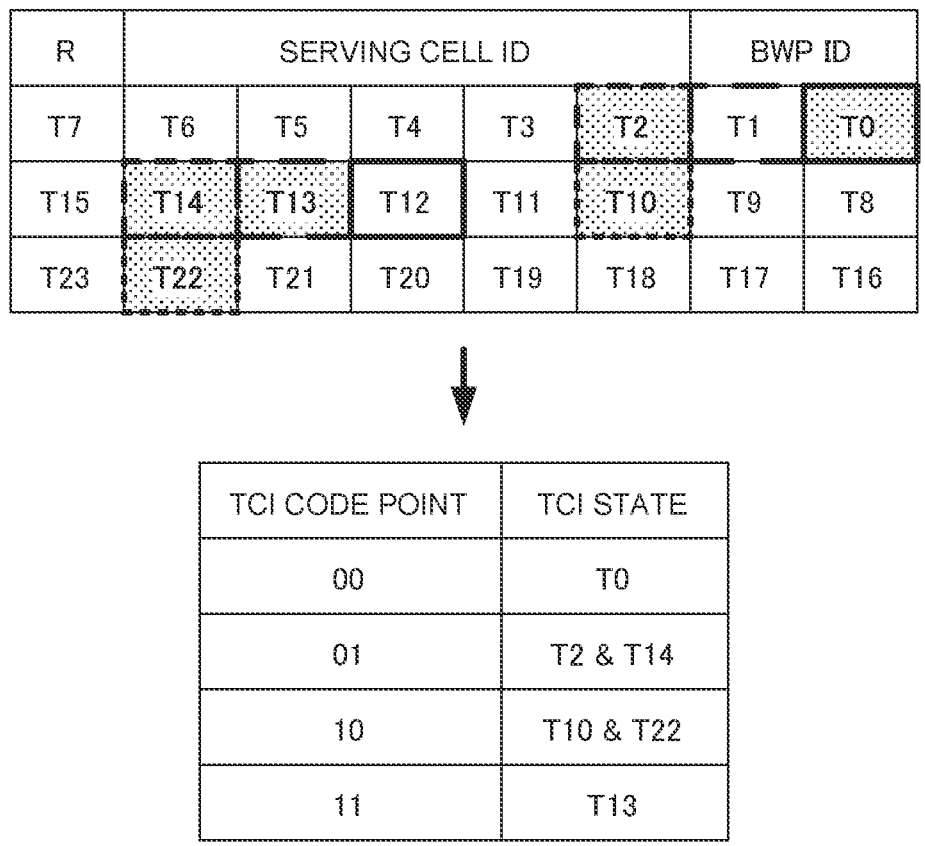
FIG. 8 is a diagram illustrating another example of a method of giving an indication of information regarding a TCI state.

Alternatively, the TCI state mapped to each code point may be determined based on the index of the TCI state actually activated according to the MAC control information (see FIG. 8). As an example, mapping to the code point may be performed in ascending order of the index among the activated TCI states.

In this case, in a case where only one TCI state constituting the pair is activated, the index of the TCI state that is not activated may not be taken into consideration to determine the order of mapping to a code point of a given field.

In this manner, one or more pairs are mapped to a given field of the DCI according to the MAC control information. Further, a pair mapped to each code point of the given field includes one or a plurality of (here, two) TCI states. Note that whether or not to apply activation of the TCI state or pair (or mapping to the DCI) according to the MAC control information may be configured by higher layer signaling or the like.

By allowing the case where the TCI states that form the pair have non-contiguous indexes, the formation of the pair can be flexibly controlled. The TCI states forming the pair may be defined in advance in the specification, or the UE may be notified of the TCI states by higher layer signaling or the like.

<TCI State Specifying by DCI>

The base station may notify the UE of the given TCI state by using the DCI. For example, the UE determines the TCI state notified from the base station based on the code point notified in the given field included in the DCI. FIG. 7C illustrates an example in which the given field has 2 bits, but the number of bits of the given field is not limited thereto. It is sufficient if the UE performs reception processing for the PDSCH transmitted from the TRP based on the notified TCI state.

The UE may determine at least one of the TRP index and the number of TRPs for transmitting the PDSCH based on the specified TCI state. For example, when an indication of a code point to which one TCI state is mapped is given, the UE may determine that the PDSCH is transmitted from one TRP. On the other hand, when an indication of a code point to which two TCI states are mapped is given, the UE may determine that the PDSCH is transmitted from a plurality of (here, two) TRPs.

As described above, by notifying the UE of the code point to which one or a plurality of TCI states are mapped, it is possible to appropriately give an indication of the TCI state corresponding to each TRP even in a case where the PDSCHs from the plurality of TRPs are scheduled by using given DCI.

(Radio Communication System)

A configuration of a radio communication system according to one embodiment of the present disclosure will be described below. In this radio communication system, communication is performed using one or a combination of the radio communication methods according to the embodiments of the present disclosure.

Figure 9:
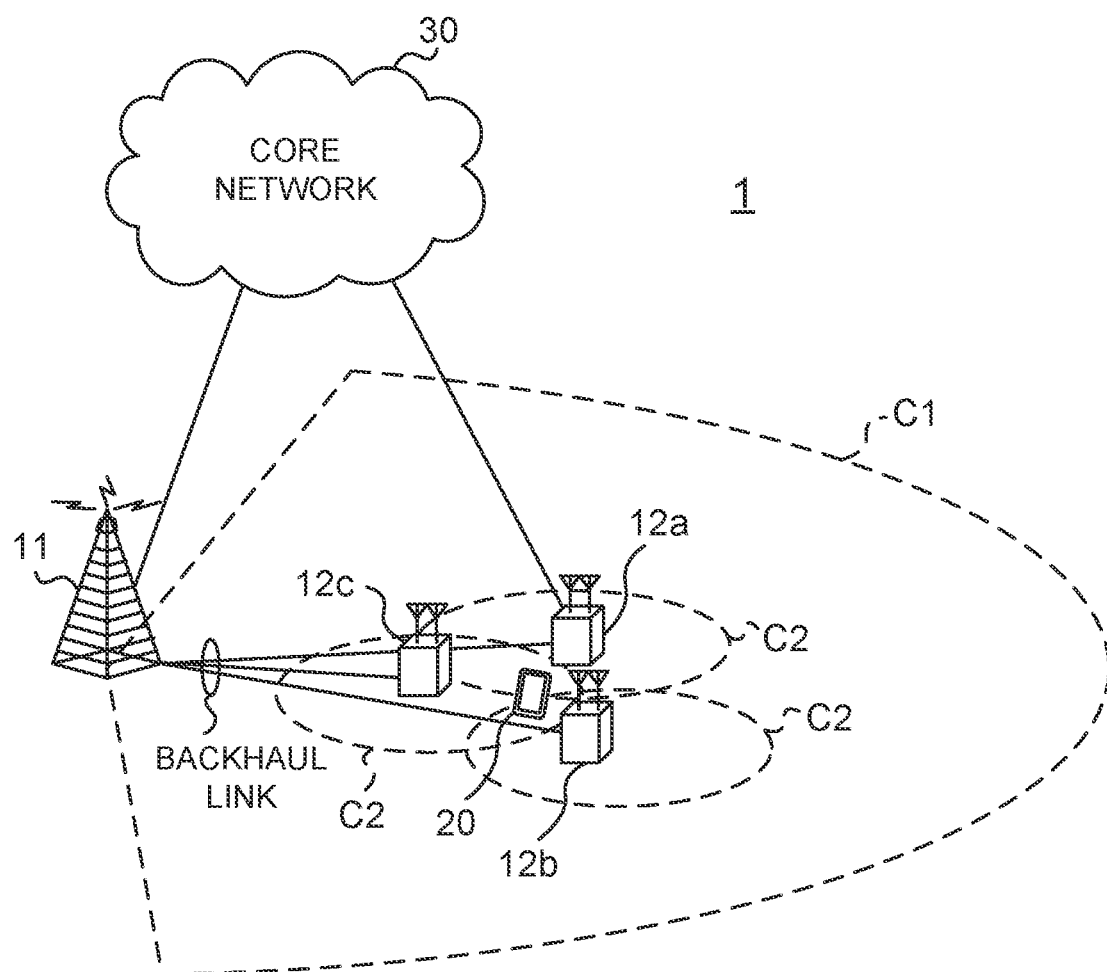
FIG. 9 is a diagram illustrating an example of a schematic configuration of a radio communication system according to one embodiment.

FIG. 9 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. User terminal 20 may be located in at least one cell. The arrangement, number, and the like of cells and the user terminal 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), and the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS block (SSB), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

(Base Station)

Figure 10:
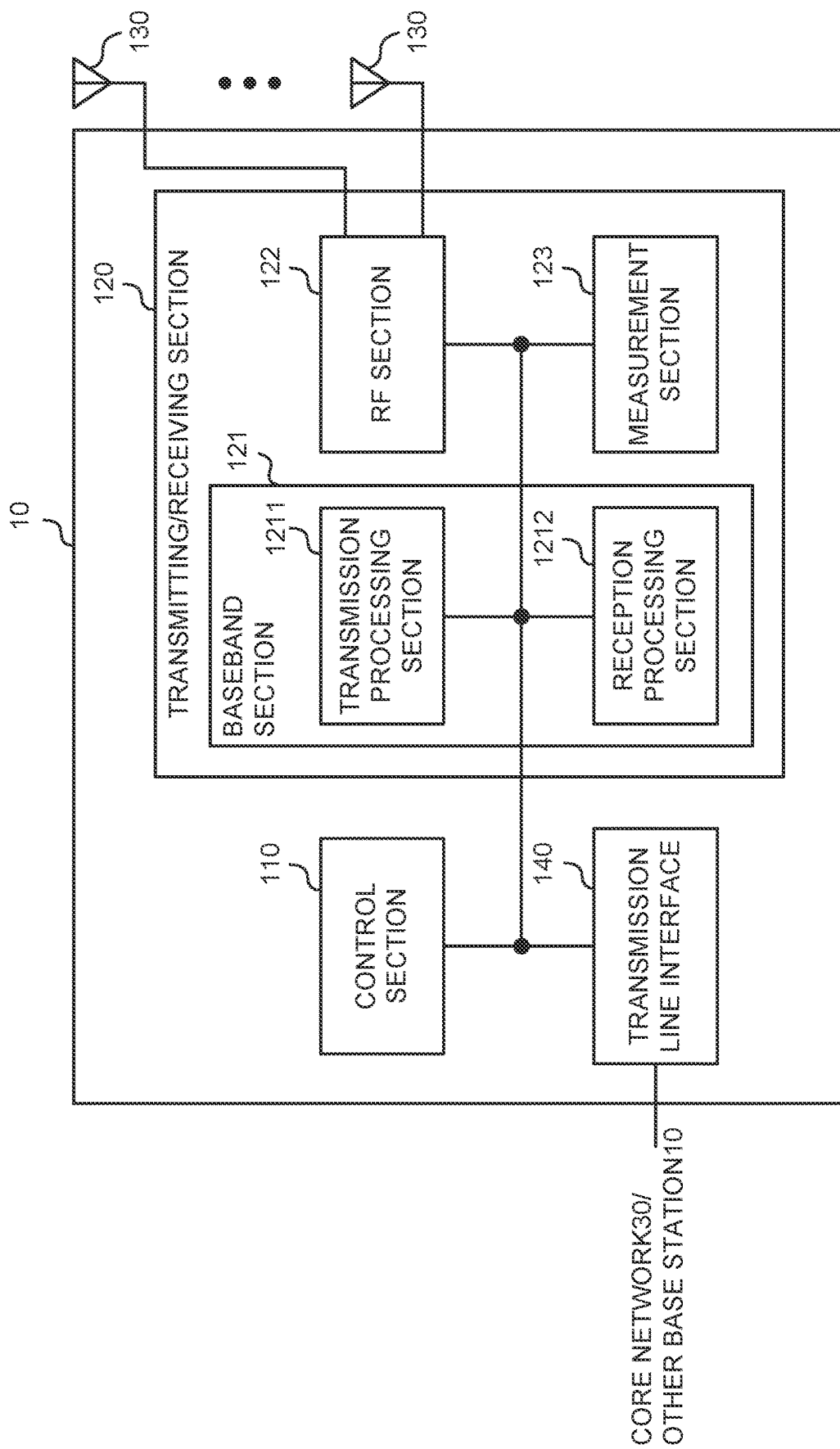
FIG. 10 is a diagram illustrating an example of a configuration of a base station according to one embodiment.

FIG. 10 is a diagram illustrating an example of a configuration of a base station according to one embodiment. The base station 10 includes a control section 110, a transmission/reception section 120, a transmission/reception antenna 130, and a transmission line interface 140. Note that one or more of the control sections 110, one or more of the transmission/reception sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmission/reception section 120, the transmission/reception antenna 130, and the transmission line interface 140. The control section 110 may generate data to be transmitted as a signal, control information, a sequence, and the like, and may transfer the data, the control information, the sequence, and the like to the transmission/reception section 120. The control section 110 may perform call processing (such as configuration or release) of a communication channel, management of the state of the base station 10, and management of a radio resource.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmission/reception section 120 may be constituted as an integrated transmission/reception section, or may be constituted by a transmission section and a reception section. The transmission section may be constituted by the transmission processing section 1211 and the RF section 122. The reception section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a transmission beam and a reception beam by using digital beam forming (for example, precoding), analog beam forming (for example, phase rotation), and the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmission/reception section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmission/reception section 120 (RF section 122) may perform modulation to a radio frequency band, filtering processing, amplification, and the like on the baseband signal, and may transmit a signal in the radio frequency band via the transmission/reception antenna 130.

Meanwhile, the transmission/reception section 120 (RF section 122) may perform amplification, filtering processing, demodulation to a baseband signal, and the like on the signal in the radio frequency band received by the transmission/reception antenna 130.

The transmission/reception section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmission/reception section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the reception section of the base station 10 in the present disclosure may be constituted by at least one of the transmission/reception section 120, the transmission/reception antenna 130, and the transmission line interface 140.

Note that the transmission/reception section 120 transmits given downlink control information including information regarding TCI states corresponding to the plurality of transmission/reception points. The transmission/reception section 120 may transmit at least one of the information regarding the set of TCI states, the information regarding the RS resource corresponding to the TCI, and the information regarding the pair of TCI states using higher layer signaling. Further, the transmission/reception section 120 may transmit MAC control information instructing activation (for example, mapping to a given field of DCI).

The control section 110 controls configuration of the TCI state, activation of the TCI state, and indication of the TCI state corresponding to the PDSCH.

(User Terminal)

Figure 11:
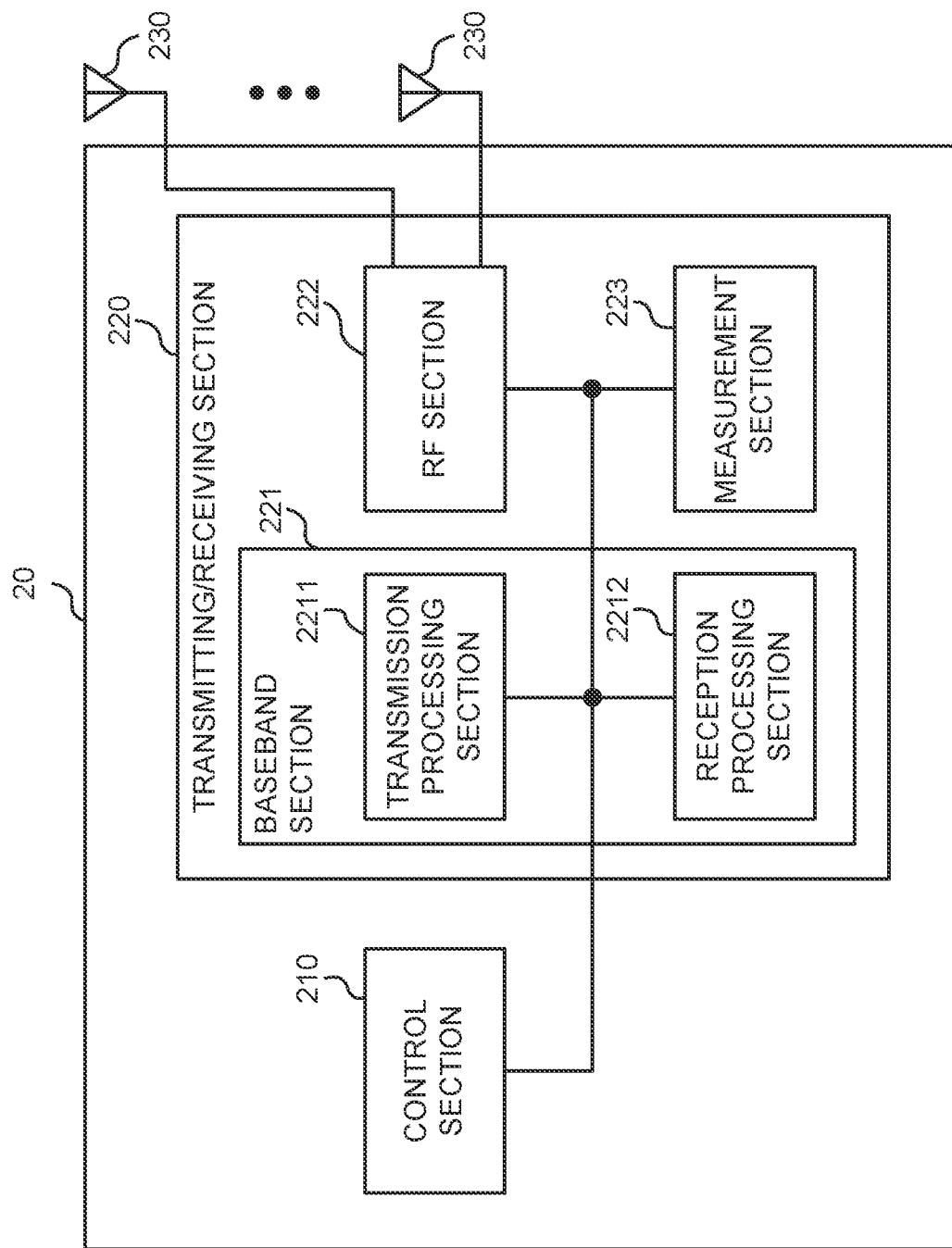
FIG. 11 is a diagram illustrating an example of a configuration of user terminal according to one embodiment.

FIG. 11 is a diagram illustrating an example of a configuration of user terminal according to one embodiment. The user terminal 20 includes a control section 210, a transmission/reception section 220, and a transmission/reception antenna 230. Note that one or more of the control sections 210, one or more of the transmission/reception sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmission/reception section 220 and the transmission/reception antenna 230. The control section 210 may generate data to be transmitted as a signal, control information, a sequence, and the like, and may transfer the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmission/reception section 220 may be constituted as an integrated transmission/reception section, or may be constituted by a transmission section and a reception section. The transmission section may be constituted by the transmission processing section 2211 and the RF section 222. The reception section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a transmission beam and a reception beam by using digital beam forming (for example, precoding), analog beam forming (for example, phase rotation), and the like.

The transmission/reception section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmission/reception section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmission/reception section 220 (transmission processing section 2211) may perform DFT processing as the transmission processing in order to transmit the channel using a DFT-s-OFDM waveform. When transform precoding is not enabled for a channel (for example, PUSCH), the transmission/reception section 220 (transmission processing section 2211) may not perform DFT processing as the transmission processing.

The transmission/reception section 220 (RF section 222) may perform modulation to a radio frequency band, filtering processing, amplification, and the like on the baseband signal, and may transmit a signal in the radio frequency band via the transmission/reception antenna 230.

Meanwhile, the transmission/reception section 220 (RF section 222) may perform amplification, filtering processing, demodulation to a baseband signal, and the like on the signal in the radio frequency band received by the transmission/reception antenna 230.

The transmission/reception section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmission/reception section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the reception section of the user terminal 20 in the present disclosure may be constituted by at least one of the transmission/reception section 220 and the transmission/reception antenna 230.

Note that the transmission/reception section 220 receives given downlink control information including information regarding TCI states corresponding to the plurality of transmission/reception points. The transmission/reception section 220 may receive higher layer signaling that gives an indication of at least one of the information regarding the set of TCI states, the information regarding the RS resource corresponding to the TCI, and the information regarding the pair of TCI states. Further, the transmission/reception section 220 may receive MAC control information instructing activation (for example, mapping to a given field of DCI).

The control section 210 controls the reception of the physical shared channel transmitted from the plurality of transmission/reception points based on given downlink control information including information regarding TCI states corresponding to each of the plurality of transmission/reception points.

A given TCI state specified by a given code point in a bit field for TCI state indication included in the downlink control information may be associated with one or a plurality of reference signal resources.

Alternatively, each code point of the bit field for TCI state indication included in the downlink control information may correspond to one or a plurality of TCI states. Each code point of the bit field for TCI state indication included in the downlink control information corresponds to one or a plurality of TCI states. Further, at least one of the index and the number of TCI states configured to each code point may be specified according to the MAC control information. Further, the plurality of TCI states that can be configured to each code point may be TCI states having contiguous indexes.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, wireless, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be called as a transmitting unit, a transmitter and the like. In any case, as described above, the implementation method is not particularly limited.

Figure 12:
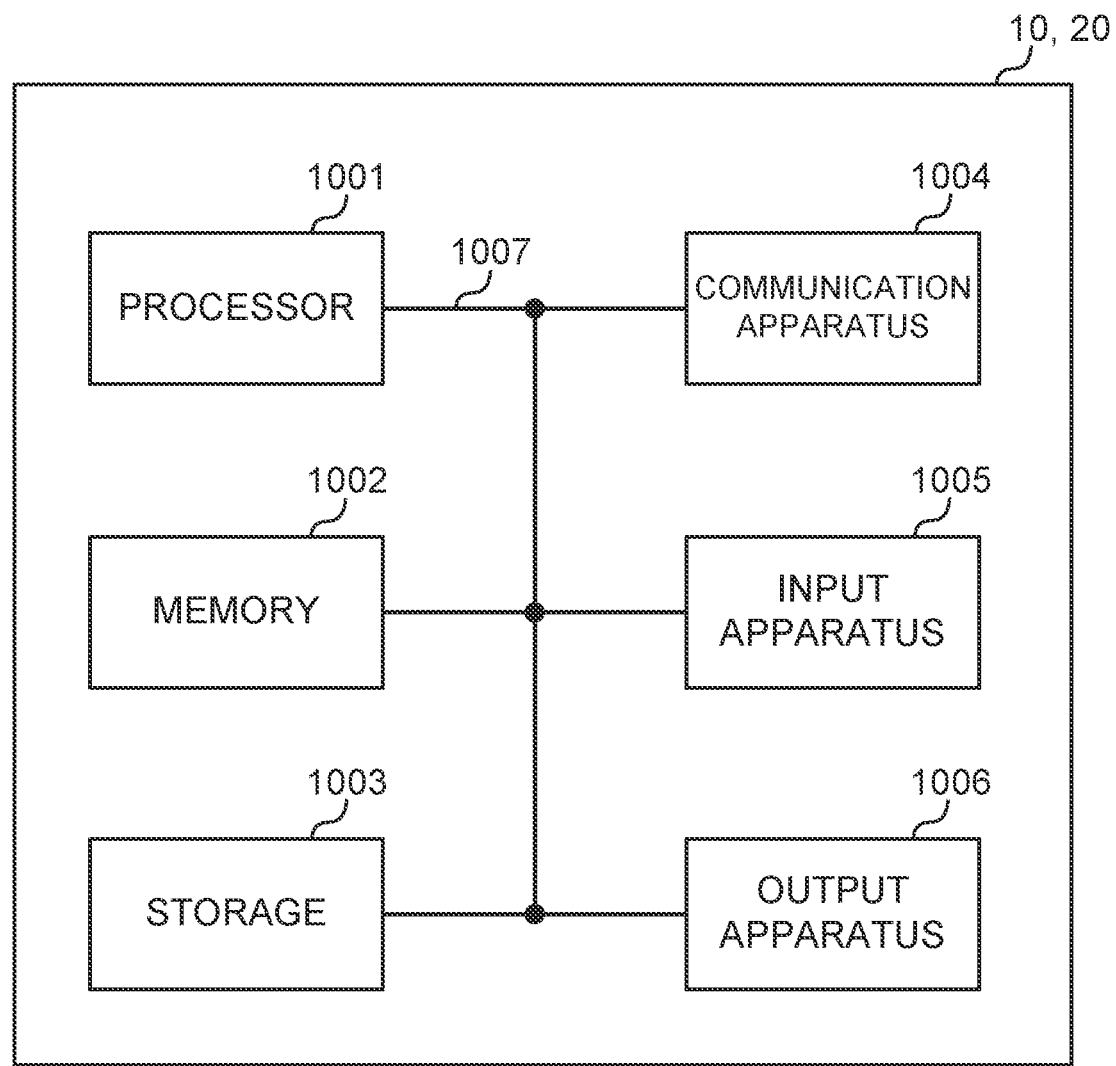
FIG. 12 is a diagram illustrating an example of a hardware configuration of a base station and user terminal according to one embodiment.

For example, the base station, the user terminal, and the like according to one embodiment of the present disclosure may function as a computer that executes the processing of the radio communication method of the present disclosure. FIG. 12 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed simultaneously, in sequence, or in different manners, by two or more processors. Note that the processor 1001 may be implemented with one or more chips.

Each of functions of the base station 10 and the user terminal 20 is implemented by causing predetermined software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 may control the whole computer by, for example, running an operating system. The processor 1001 may be configured with a central processing unit (CPU), which includes interfaces with peripheral equipment, control apparatus, operation apparatus, a register, and the like. For example, at least a part of the above-described control section 110(210), transmission/reception section 120 (220), and the like may be implemented by the processor 1001.

Furthermore, the processor 1001 reads programs (program codes), software modules, or data, from at least one of the storage 1003 and the communication apparatus 1004, into the memory 1002, and executes various processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may be constituted by, for example, at least one of a read only memory (ROM), an erasable programmable ROM (EPROM), an electrically EPROM (EEPROM), a random access memory (RAM) and/or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmitting/receiving device) for allowing inter-computer communication by using at least one of a wired network and a wireless network, and may be referred to as, for example, a network device, a network controller, a network card, a communication module, and the like. The communication apparatus 1004 may be constituted by a high frequency switch, a duplexer, a filter, a frequency synthesizer, and the like in order to implement, for example, at least one of frequency division duplex (FDD) and time division duplex (TDD). For example, the transmission/reception section 120(220), the transmission/reception antenna 130(230), and the like described above may be implemented by the communication apparatus 1004. The transmission/reception section 120(220) may be implemented by physically or logically separating a transmission section 120a(220a) and a reception section 120b(220b) from each other.

The input apparatus 1005 is an input device for receiving input from the outside (for example, a keyboard, a mouse, a microphone, a switch, a button, a sensor, and the like). The output apparatus 1006 is an output device for allowing output to the outside (for example, a display, a speaker, a light emitting diode (LED) lamp, and the like). Note that the input apparatus 1005 and the output apparatus 1006 may be provided in an integrated configuration (for example, a touch panel).

Further, the apparatuses such as the processor 1001 and the memory 1002 are connected by the bus 1007 for communicating information. The bus 1007 may be configured with a single bus, or may be configured with different buses between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (or signaling) may be replaced with each other. Further, the signal may be a message. The reference signal can be abbreviated as an RS, and may be referred to as a pilot, a pilot signal and the like, depending on the standard applied. Furthermore, a component carrier (CC) may be referred to as a cell, a frequency carrier, a carrier frequency, and the like.

A radio frame may include one or a plurality of periods (frames) in a time domain. Each of one or a plurality of periods (frames) constituting a radio frame may be referred to as a subframe. Furthermore, a subframe may be constituted by one or a plurality of slots in the time domain. A subframe may be a fixed time duration (for example, 1 ms) that is not dependent on numerology.

Here, numerology may be a communication parameter applied to at least one of transmission and reception of a certain signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

A slot may be constituted by one or a plurality of symbols in the time domain (orthogonal frequency division multiplexing (OFDM) symbols, single carrier frequency division multiple access (SC-FDMA) symbols, and the like). Further, the slot may be a time unit based on numerology.

A slot may include a plurality of mini slots. Each mini slot may be constituted by one or a plurality of symbols in the time domain. Further, a mini slot may be referred to as a subslot. The mini slot may include fewer symbols than the slot. A PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot and a symbol all represent the time unit in signal transmission. The radio frame, the subframe, the slot, the mini slot, and the symbol may be each called by other applicable names. Note that time units such as a frame, a subframe, a slot, a mini slot, and a symbol in the present disclosure may be replaced with each other.

For example, one subframe may be referred to as TTI, a plurality of contiguous subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a slot, a mini slot or the like, instead of a subframe.

Here, the TTI refers to, for example, the minimum time unit of scheduling in radio communication. For example, in LTE systems, the base station schedules the radio resources (such as the frequency bandwidth and transmission power that can be used in each user terminal) to allocate to each user terminal in TTI units. Note that the definition of TTI is not limited thereto.

The TTI may be the transmission time unit of channel-encoded data packets (transport blocks), code blocks, codewords, or the like, or may be the unit of processing in scheduling, link adaptation, or the like. Note that, when the TTI is given, a time interval (for example, the number of symbols) to which the transport block, code block, codeword, or the like is actually mapped may be shorter than the TTI.

Note that, when one slot or one mini slot is referred to as a TTI, one or more TTIs (that is, one or more slots or one or more mini slots) may be the minimum time unit of scheduling. Further, the number of slots (the number of mini slots) constituting the minimum time unit of scheduling may be controlled.

A TTI having a time length of 1 ms may be referred to as a usual TTI (TTI in 3GPP Rel.8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a normal TTI, a subframe, or the like) may be replaced with a TTI having a time length exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may, for example, be 12. The number of subcarriers included in the RB may be determined based on the numerology.

Further, the RB may include one or a plurality of symbols in the time domain, and may have a length of one slot, one mini slot, one subframe, or one TTI. One TTI, one subframe, and the like each may be constituted by one or a plurality of resource blocks.

Note that one or a plurality of RBs may be referred to as a physical resource block (PRB (Physical RB)), a subcarrier group (SCG (Sub-Carrier Group)), a resource element group (REG), a PRB pair, an RB pair, or the like.

Furthermore, a resource block may be constituted by one or a plurality of resource elements (REs). For example, one RE may be a radio resource area of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include BWP for UL (UL BWP) and BWP for DL (DL BWP). For the UE, one or a plurality of BWPs may be configured within one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

Note that the structures of radio frames, subframes, slots, mini slots, symbols and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, a radio resource may be instructed by a given index.

The names used for parameters and the like in the present disclosure are in no respect limiting. In addition, an equation and the like using these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a variety of different technologies. For example, data, instructions, commands, information, signals, bits, symbols, chips, and the like all of which may be referenced throughout the above-described description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated or appended. The information, signals, and the like that are output may be deleted. The information, signals, and the like that are input may be transmitted to another apparatus.

Indication of information may be performed not only by using the aspects/embodiments described in the present disclosure but also using another method. For example, indication of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, an indication of MAC signaling may be given using, for example, MAC control elements (MAC control elements (CEs)).

Further, an indication of given information (for example, indication of "being X") is not limited to explicit indication but may be performed implicitly (for example, by not performing indication of the given information or by performing indication of another piece of information).

Decisions may be made in values represented by one bit (0 or 1), may be made in Boolean values that represent true or false, or may be made by comparing numerical values (for example, comparison against a given value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, software, instruction, information, and the like may be transmitted/received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (remote radio heads (RRHs)). The term "cell" or "sector" refers to a part or the whole of a coverage area of at least one of a base station and a base station subsystem that perform a communication service in this coverage.

In the present disclosure, the terms such as "mobile station (MS)", "user equipment (user terminal)", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving body, a moving body itself, and the like. The moving body may be a transportation (for example, a car, an airplane and the like), an unmanned moving body (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may be configured to have the functions of the base station 10 described above. Further, the wording such as "uplink" and "downlink" may be replaced with the wording corresponding to the terminal-to-terminal communication (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20

In the present disclosure, the operation performed by the base station may be performed by an upper node thereof in some cases. In a network including one or a plurality of network nodes with base stations, it is clear that various operations performed for communication with a terminal can be performed by a base station, one or a plurality of network nodes (examples of which include but are not limited to mobility management entity (MME) and serving-gateway (S-GW)) other than the base station), or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (TUMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "based on" as used in the present disclosure does not mean "based on only", unless otherwise specified. In other words, the phrase "based on" means both "based only on" and "based at least on".

Any reference to an element using designations such as "first" and "second" used in the present disclosure does not generally limit the amount or order of these elements. These designations may be used in the present disclosure as a method convenient in distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Further, "determining" may be regarded as "determining" of resolving, selecting, choosing, establishing, comparing, and the like. In other words, "determining" may be regarded as "determining" of a certain operation.

Further, "determining" may be replaced with "assuming", "expecting", "considering", and the like.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided for the purpose of exemplification and explanation, and has no limitative meaning to the invention according to the present disclosure.

The invention claimed is:

1. A terminal comprising:
a receiver that receives a medium access control-control element (MAC CE) indicating a transmission configuration indication (TCI) state mapped to each codepoint of a TCI field included in downlink control information (DCI); and a processor that controls, based on a TCI state corresponding to a codepoint indicated by the TCI field, reception of a downlink shared channel (PDSCH), wherein it is supported that when two TCI states are mapped to a codepoint indicated by the TCI field, the two TCI states correspond to different CDM groups, mapping of two TCI states with non-contiguous indexes to one codepoint indicated by the TCI field is supported based on a plurality of higher layer signaling, and a maximum number of TCI states mapped to the codepoint indicated by the TCI field is two.

2. A radio communication method for a terminal, comprising:

receiving a medium access control-control element (MAC CE) indicating a transmission configuration indicator (TCI) state mapped to each codepoint of a TCI field included in downlink control information (DCI); and controlling, based on a TCI state corresponding to a codepoint indicated by the TCI field, reception of a downlink shared channel (PDSCH), wherein it is supported that when two TCI states are mapped to a codepoint indicated by the TCI field, the two TCI states correspond to different CDM groups, mapping of two TCI states with non-contiguous indexes to one codepoint indicated by the TCI field is supported based on a plurality of higher layer signaling, and a maximum number of TCI states mapped to the codepoint indicated by the TCI field is two.

3. A base station comprising:

a transmitter that transmits a medium access control-control element (MAC CE) indicating a transmission configuration indication (TCI) state mapped to each codepoint of a TCI field included in downlink control information (DCI); and a processor that controls to indicate, by a codepoint indicated by the TCI field, a TCI state corresponding to a downlink shared channel (PDSCH), wherein it is supported that when two TCI states are mapped to a codepoint indicated by the TCI field, the two TCI states correspond to different CDM groups, mapping of two TCI states with non-contiguous indexes to one codepoint indicated by the TCI field is supported based on a plurality of higher layer signaling, and a maximum number of TCI states mapped to the codepoint indicated by the TCI field is two.

4. A system comprising a terminal and a base station, wherein the terminal comprises:

a receiver that receives a medium access control-control element (MAC CE) indicating a transmission configuration indication (TCI) state mapped to each codepoint of a TCI field included in downlink control information (DCI); and a processor that controls, based on a TCI state corresponding to a codepoint indicated by the TCI field, reception of a downlink shared channel (PDSCH), wherein mapping of two TCI states with non-contiguous indexes to one codepoint indicated by the TCI field is supported based on a plurality of higher layer signaling, and a maximum number of TCI states mapped to the codepoint indicated by the TCI field is two, and the base station comprises:

a transmitter that transmits the MAC CE; and a processor that controls to indicate, by a codepoint indicated by the TCI field, a TCI state corresponding to the PDSCH, wherein it is supported that when two TCI states are mapped to a codepoint indicated by the TCI field, the two TCI states correspond to different CDM groups.

* * * * *